United States Patent
De Zen

(10) Patent No.: US 6,253,527 B1
(45) Date of Patent: Jul. 3, 2001

(54) PROCESS OF MAKING PRODUCTS FROM RECYCLED MATERIAL CONTAINING PLASTICS

(75) Inventor: Vic De Zen, Woodbridge (CA)

(73) Assignee: Royal Ecoproducts Limited, Woodbridge (*) Notice: Subject to any disclaimer, the term of this patent is extended or adjusted under 35 U.S.C. 154(b) by 0 days.

(21) Appl. No.: 09/227,402

(22) PCT Filed: Jul. 9, 1997

(86) PCT No.: PCT/CA97/00483

§ 371 Date: Jan. 8, 1999

§ 102(e) Date: Jan. 8, 1999

(87) PCT Pub. No.: WO98/01275

PCT Pub. Date: Jan. 15, 1998

(30) Foreign Application Priority Data

Jul. 10, 1996 (CA) .................................................. 2180882

(51) Int. Cl.[7] .............................. E04C 2/26; B29B 17/00; B29C 43/00; B09B 3/00
(52) U.S. Cl. .................. 52/745.05; 52/784.1; 52/784.15; 52/784.16; 52/DIG. 9; 264/68; 264/343; 264/911; 264/914
(58) Field of Search .............................. 52/784.1, 784.15, 52/784.16, DIG. 9, 741.1, 745.05; 264/68, 343, 911, 914

(56) References Cited

U.S. PATENT DOCUMENTS

| | | | |
|---|---|---|---|
| 4,003,866 | 1/1977 | Paturle . | |
| 4,187,352 | * 2/1980 | Klobbie | ............................. 521/79 X |
| 4,303,349 | 12/1981 | Upton . | |
| 4,427,818 | * 1/1984 | Prusinski | ......................... 524/442 X |
| 4,968,463 | * 11/1990 | Levasseur | ........................... 264/40.1 |
| 5,075,957 | 12/1991 | Hoedl . | |
| 5,406,768 | * 4/1995 | Giuseppe et al. | ................... 52/730.4 |
| 5,720,142 | * 2/1998 | Morrison | ............................ 52/309.9 |
| 6,004,668 | * 12/1999 | Deaner et al. | ....................... 428/326 |

FOREIGN PATENT DOCUMENTS

| | | |
|---|---|---|
| 26 15 610 | 10/1977 | (DE) . |
| 44 15 406 | 11/1995 | (DE) . |
| 0 401 885 | 12/1990 | (EP) . |

* cited by examiner

*Primary Examiner*—Christopher T. Kent

(57) ABSTRACT

Composite products comprising or incorporating compression moldings of waste or filler particles (16) encapsulated and bound together by a thermoplastic binder (15) into a compacted mass of a shape selected for its end use, the compression molding being prepared by intensely mixing together particles of thermoplastic and waste or filler material to raise their temperature to bring the thermoplastic particles to a molten state where they coat the waste or filler particles (16), then compression molding the hot coated waste or filler particles.

10 Claims, 7 Drawing Sheets

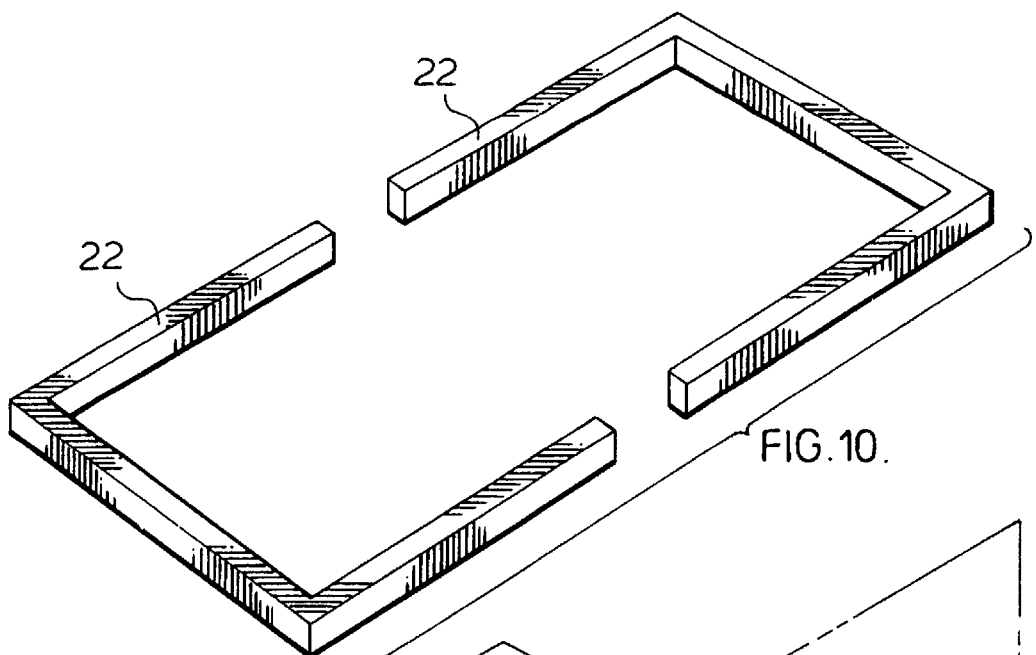
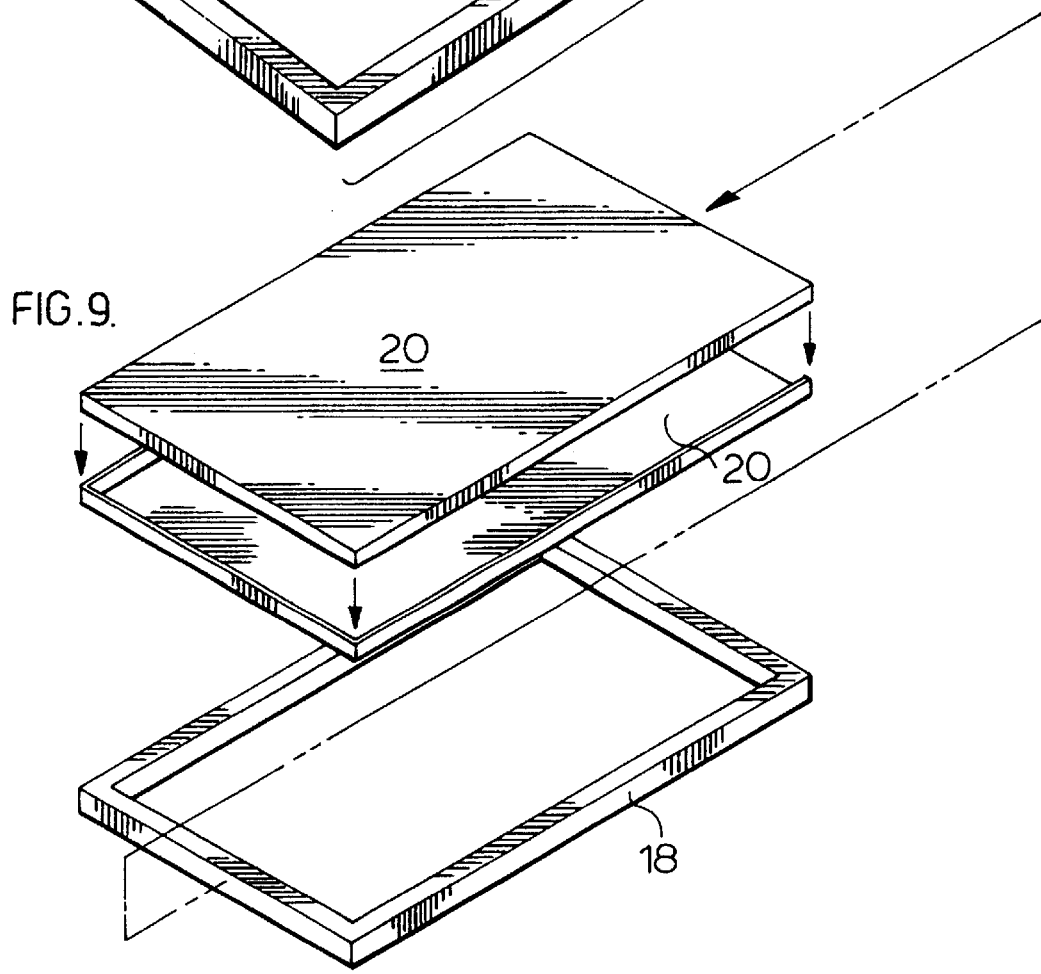
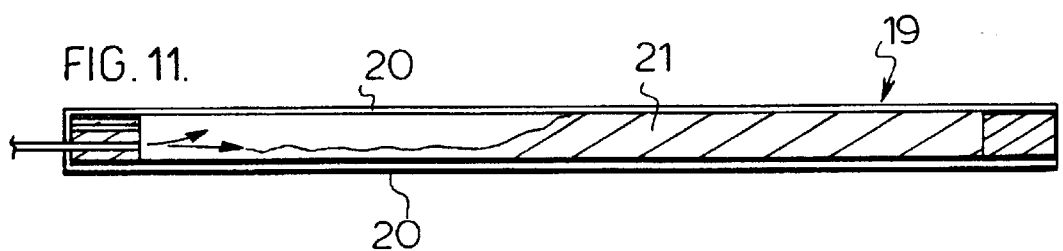

PROCESS OF MAKING PRODUCTS FROM RECYCLED MATERIAL CONTAINING PLASTICS

FIELD OF THE INVENTION

This invention relates particularly to products of the type which presently are formed with wood, or use wood, plywood or other board or the like as the supporting substructure or base.

BACKGROUND OF THE INVENTION

There are at present a large number of products which are formed with wood or use wood, plywood or the like as a structural component, substructure, or base to provide the requisite physical properties such as tensile and structural strength, rigidity and shape to which surface attachments, covers, or coatings can be screwed, nailed, glued or otherwise fastened, applied or attached.

Typical examples include insulated steel doors which use a perimeter frame of wood to which steel sheeting is applied on opposite sides thereof and the frame then filled with foamed insulation.

Other examples include wood door and window frame profiles whose exposed surfaces may be painted, covered or clad, for instance, with plastic or aluminium, or wood clad door panels used in folding or swing doors for garages or for truck or other vehicle doors and the like.

With such present products, the physical properties of the available components or substructures are relatively limited being determined by the selection of the wood, plywood or other board which is produced by conventional manufacturing processes.

Moreover, substantial wastage of wood by splintering, warping or by virtue of imperfections occurs in the manufacturing processes, and often the final product is subject to water absorption, warping, delamination and rotting.

Further, if other than conventional regular shapes of such materials, such as square or rectangular, are required for their end use, such shapes must be fabricated by sawing, cutting and/or assembling individual pieces and securing them together with nails, screws or other fastening means.

Composite materials which can be molded or processed into products have been proposed. For example, U.S. Pat. No. 5,075,057, issued Dec. 24th, 1991, discloses producing a product in which scrap plastic material containing some thermoplastic material is shredded, milled and homogenized into a free flowing powder which is then warmed by subjecting same to heat to a temperature below the softening temperature of the plastic. This heated free flowing powder is then dry blended with filler material which preferably is heated or pretreated, eg. with chemicals. The dry blend is then compression molded at elevated temperatures and pressures.

U.S. Pat. No. 4,003,866, issued Jan. 18th, 1997, discloses a construction material comprising a plastic component containing a thermoplastic resin and a filler component. These components are mixed together under the application of heat. To improve the adhesion between the plastic material and the filler material, such as wood wastes, the particles of filler material before being mixed with the plastic are precoated under the application of heat tumbling with the polyethythlene or polypropylene wax having a molecular weight of from 1,000 to 10,000, a thermofluid high molecular weight polymer, or a silicate coating material.

Such prior art materials involving the various mixing, heating and coating steps are relatively expensive to produce and an adequate intimacy of bond between the plastic and filler is difficult to achieve.

SUMMARY OF THE INVENTION

The present invention is directed to providing very low cost and very durable products of composite material having superior qualities.

According to the invention such composite products are prepared by first subjecting a mixture of thermoplastic particles and particles of waste or filler material to a high intensity mixing operation to frictionally heat the particles to bring the thermoplastic particles to a molten state to wet and adhere to and coat or substantially coat or encapsulate the hot waste or filler particles bonding them together. The hot mixture is then subjected to a compression molding operation to compress the coated waste or filler particles together to force the molten thermoplastic material into the interstices and irregularities of the waste or filler particles to ensure their encapsulation while effecting a high strength bonding between the particles. On cooling and hardening of the thermoplastic material, there is created a dense. compacted composite product of the desired shape having a very high internal bonding.

The particles of thermoplastic material and waste or filler material used to produce the composite products of the invention may vary in size from a powder to particles of a size of about 1 centimeter. These particles may be prepared as necessary by shredding grinding or the like.

The high intensity mixing of the selected mixture of thermoplastic and waste or filler particulate material can be effectively carried out by introducing the mixture into a high intensity batch mixer in which rotating blades rotating at high tip speeds of the order of some 20 meters per second within a cylindrical chamber propel the particles into collision with each other and the mixer wall. This bombardment action not only effects intimate mixing of the particles but raises their temperature through a thermo-kinetic effect or internal frictional healing. As mixing continues, the thermoplastic particles first soften and then reach a molten state where they melt and wet and stick to the hot solid or unmelted particles so that the hot solid particles are coated and bonded together by the molten thermoplastic material.

The hot coated bonded waste or filler particles are then subject to a compacting pressure in a compression molding step wherein the molten thermoplastic material is forced into the fibers, pores, crevices, or irregularities of the waste or filler particles depending on their nature to lock these particles in the thermoplastic material ensuring their complete encapsulation and strengthening or enhancing the bonding between such entrapped or locked in particles.

The result of the compression molding step is the production of a product formed of densely compacted particulate material encapsulated and held together in an extremely strong bond by the thermoplastic material.

By preparing composite molded products as aforesaid, useful composite products, components or substructures can be produced using as little as 10% by weight of thermoplastic material, the rest being waste, recycled, or filler particulate material.

Further, according to the invention, such composite components or substructures may be incorporated into a composite product in which the component or substructure carries or is used to support a covering or cladding covering at least a portion of the surface thereof.

Because the thermoplastic material's function is to encapsulate and bind together the waste or filler particles, the invention enables the effective use of waste or recycled thermoplastic materials, such as reground low, medium, and high density polyethylene, polypropylene, polyethylene terephthalate (PET), nylon, PVC, ABS, and other ground up thermoplastic material as sources of thermoplastic material.

Particulate material which can be advantageously used as fillers are fibrous materials such as wood particles, i.e. sawdust, ground up wood pieces. ground cloth, paper, glass fibers, and reground thermosetting materials.

Still other examples of particulate material that are useful as fillers are waste materials such as fly ash, kiln dust, ground peanut shells, rice husks or corn husks. It will also be understood that many other particulate materials such as particles of rubber, metal, sand, concrete or the like may also be used.

Thus, it will be appreciated that the invention enables the production of highly useful products while at the same time achieving important environmental benefits by using up waste material which would otherwise have to be disposed of at an appropriate site.

It will be understood that various mixtures of particulate material can be used as desired or required. For instance, the inclusion of the fibrous particulate material provides good control of the expansion properties of the molded composite product, component, or substructure, a necessity where the end composite product such as a door frame or panel whose shape and size is governed by the substructure is exposed to a wide range of temperatures during the year.

Again, the use of particulate material such as fly ash, glass particles, kiln dust imparts strength and rigidity to in the composite product of which it forms the base.

The thermoplastic binder also is preferably a recycled thermoplastic such as PVC or one of the polyethylenes or a mixture of recycled thermoplastic materials whose melting points are relatively similar. In this way, the entire substructure can comprise recycled or waste materials molded into a highly useful compacted structural component exhibiting the selected physical properties. It will be understood that such a component will be free from water absorption, warping, splintering or otherwise deteriorating under its intended use.

The amount of thermoplastic binder per weight of the molded product, component, or substructure can vary from about 10% to about 90% by weight with the encapsulated particulate material varying from about 90% to about 10% by weight of the product depending upon its end use.

For most uses, the thermoplastic binder preferably comprises from about 40% to 60% by weight and the physical property controlling particulate material from about 60% to about 40% by weight of the molded product.

Because the preparation of the composite product, component, or substructure is a molding, it will be understood that it can be produced in a very wide range of shapes without having to be fabricated so that it can be used for, or as a base for, a very wide range of products. Examples of such products utilizing the invention comprise insulated steel doors, door frame profiles, window frame profiles, swinging door panels, folding door panels for buildings or vehicles, or other products where the shape and physical characteristics of the final product are important.

Further, it will be understood that while the compacted intimately bonded nature of the molded product, structural component or substructure makes it a solid sturdy structure, and the encapsulation of the particulate material by the thermoplastic binder renders it impervious to moisture, insects, rotting, and the like, while at the same time locking in the waste or filler particles through their encapsulation so that they are effectively and safely environmentally disposed of while serving a very useful purpose.

It will be understood that the composite molded products, components or substructures prepared as set out above can be readily drilled, cut or machined and will readily accept and retain nails, screws, staples or other fasteners. Surface covering or other exterior attachments can also be readily bonded thereto using commercial industrial adhesives. Also, with appropriate preparation of the surface of such molded composite products, they can be painted if desired.

BRIEF DESCRIPTION OF THE DRAWINGS

FIG. 4 is a broken away cross sectional view through one of the vertical edges of the door which has been grooved to receive a plastic cap.

FIG. 9 is a perspective view illustrating the assembly of a composite panel comprising a compression molded substructure in the form of a frame ready to be introduced between cover sheets or panels.

FIG. 10 illustrates a substitute frame for that shown in FIG. 9 in which the frame comes in two sections.

FIG. 11 is a cross sectional view of the assembled panel of FIG. 9 and showing the introduction of insulating foam into the interior thereof.

DETAILED DESCRIPTION ACCORDING TO THE PREFERRED EMBODIMENTS OF THE PRESENT INVENTION

Figure 1:
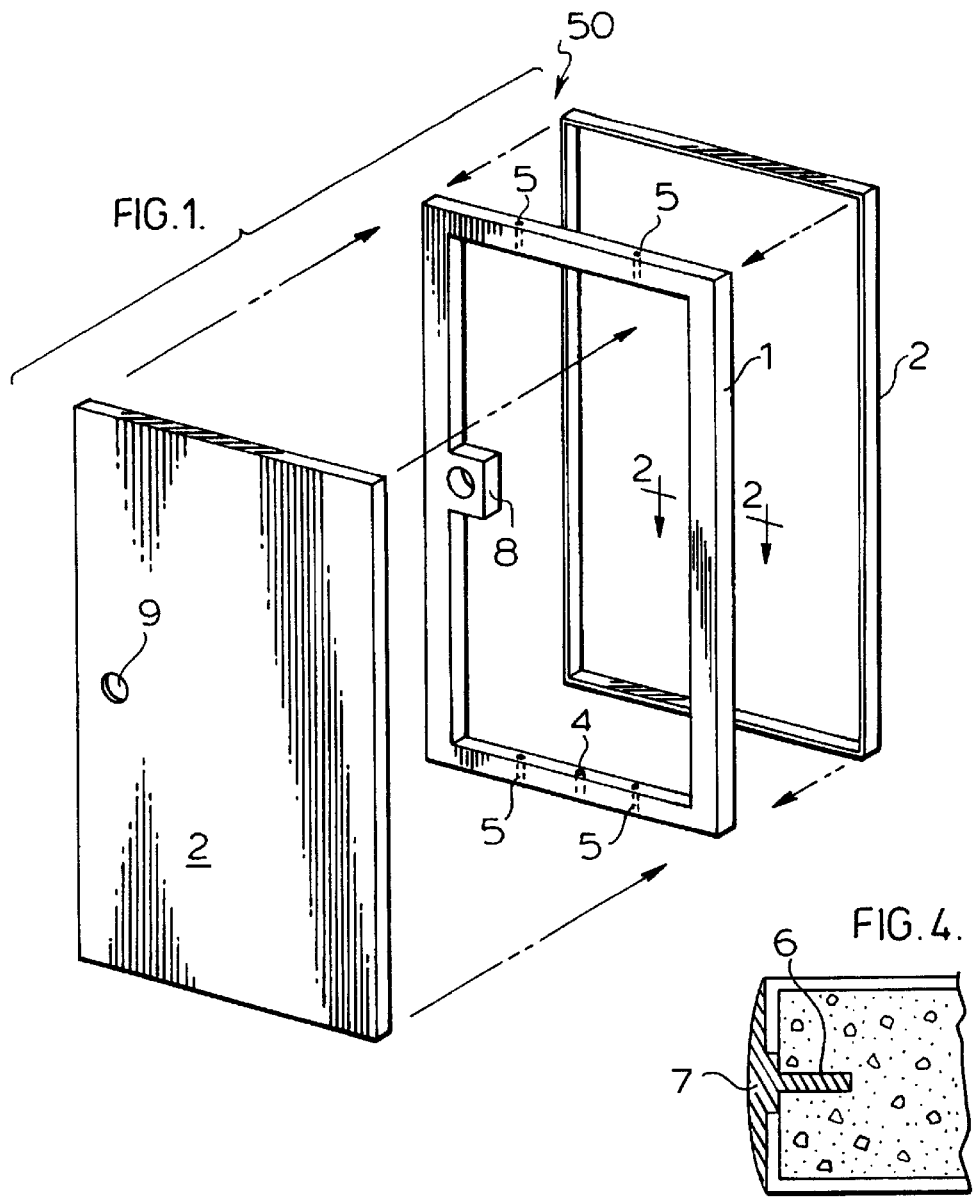
FIG. 1 is an exploded perspective view showing the components of a composite steel door having as a substructure a compression molded composite frame prepared in accordance with the invention.
Figure 2:
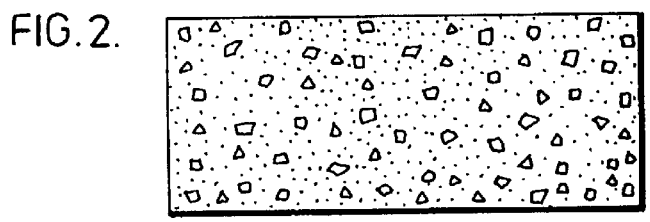
FIG. 2 is a cross section on the line 2—2 of FIG. 1.
Figure 3:
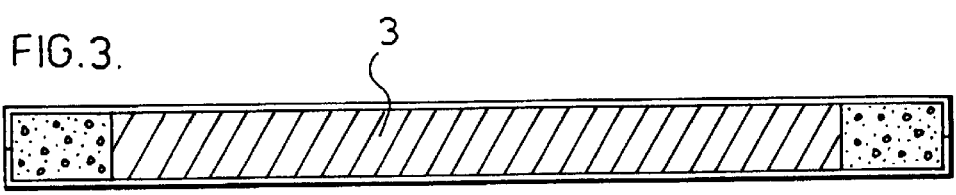
FIG. 3 is a cross section on the completed door showing the interior filled with an insulation material.

The assembling of the steel door 50 illustrated in FIG. 1 is simply one example of a product according to the invention using a composite substructure prepared according to the invention.

As illustrated, the door is made up of a frame 1 comprising a compression molding of particulate material encapsulated and bound together by a thermoplastic binder produced according to the invention. This frame forms the substructure to which steel cover plates 2 are secured by any suitable means such as nails, screws, industrial glues.

When assembled, the hollow interior of the frame can then be filled with insulating material 3 such as foamed polyurethane which can be introduced into the interior of the frame through a bore 4 illustrated in FIG. 1 drilled through the frame which is further provided with bleed holes 5 to allow for the escape of air from the interior of the frame during the foaming operation.

As the substructure involved, that is the frame 1 in FIG. 1, according to the invention is resistant to paint applications without an appropriate surface treatment or preparation, the exposed vertical edges of the substructure frame can be grooved as at 6 to receive and retain an edge plastic cover 7.

As illustrated in FIG. 1, the frame 1 is provided with an inward projection 8 registering with a hole 9 in the front cover plate or panel 2 for the mounting of the door handle or knob and the associated latching mechanism (not shown).

Figure 5:
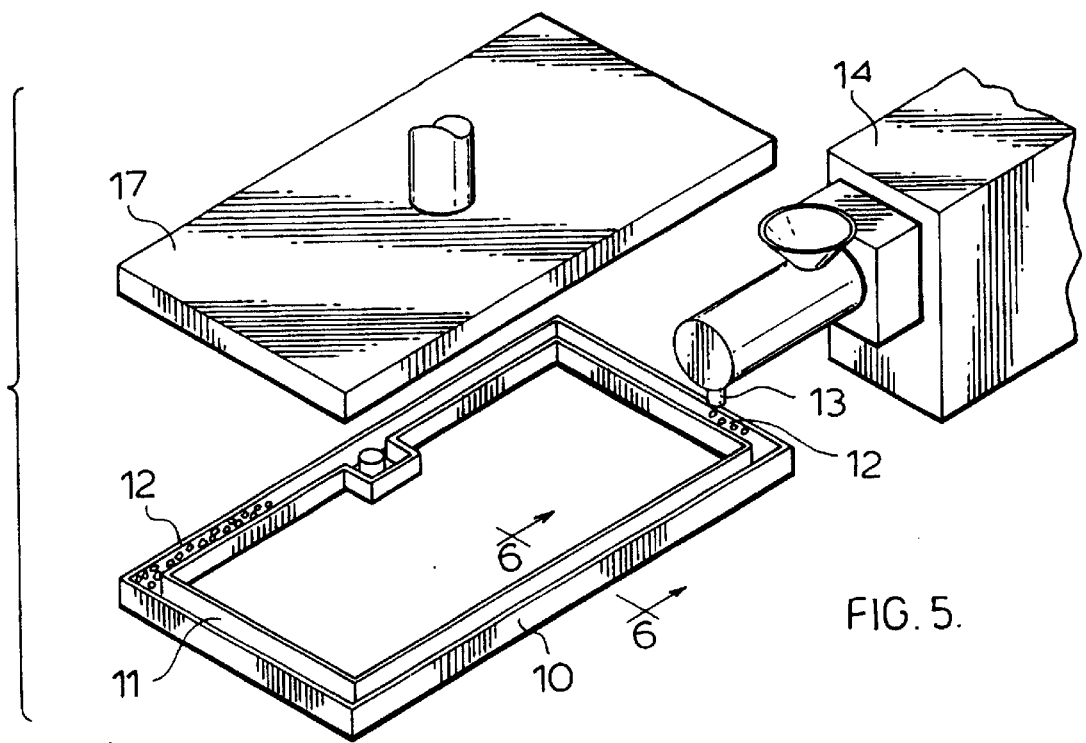
FIG. 5 is a perspective view illustrating the molding operation in which a rope of thermoplastic binder heated to a molten flowable viscous state and containing hot coated or substantially coated or encapsulated particulate filler material is deposited in a mold ready for compression.

FIG. 5 shows the mold 10 for molding the frame 1 which comprises a channel 11 corresponding to the shape of the frame 1 and into this channel is laid a charge in the form of a rope 12 of molten composite material produced in a high intensity mixer and forced out of nozzle 13 either by screw feed or ram ejection from feeder 14 which is caused to move around the channel 11 as it delivers its feed by any suitable means, preferably a robotic device (not shown).

As explained, the material forming the molten charge 12 is prepared by selecting a mixture of thermoplastic particles and waste or filler particles which may in this instance be wood, flour, or sawdust.

The mixture is then introduced into a high intensity batch mixer in which the blades rotating in the cylindrical mixing chamber produce tip speeds which may be of the order of some 20 meters per second propel the particles into collisions with each other and the cylindrical mixer wall. This bombardment action ensures thorough and intimate mixing of the particles which raises their temperature through the thermo-kinetic effect or internal frictional heating. As mixing continues, the thermoplastic particles, or at least those with lower melting temperatures, first soften around the temperature of about 160 to 170° C. depending on the plastic involved. On continuing mixing, the softened thermoplastic particles are brought to a molten state at a temperature of about 200 to 230° C. where they wet or coat and stick to the hot solid unmelted particles so that the hot solid particles are bonded together and encapsulated or at least substantially encapsulated by the molten thermoplastic material.

Figure 6:
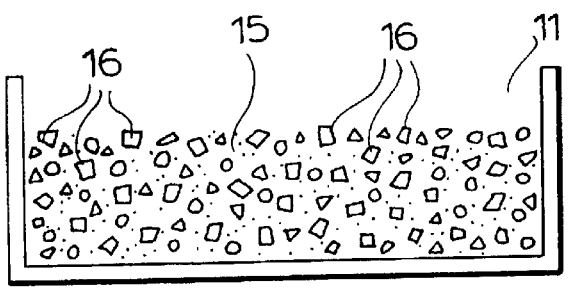
FIG. 6 is a section on line 6—6 of FIG. 5.

FIG. 6 which is a cross section showing the molten charge or rope 12 after it has been laid down in the channel 11 and settles in the channel illustrates diagrammatically the molten thermoplastic material 15 and the particulate material at 16.

Figure 7:
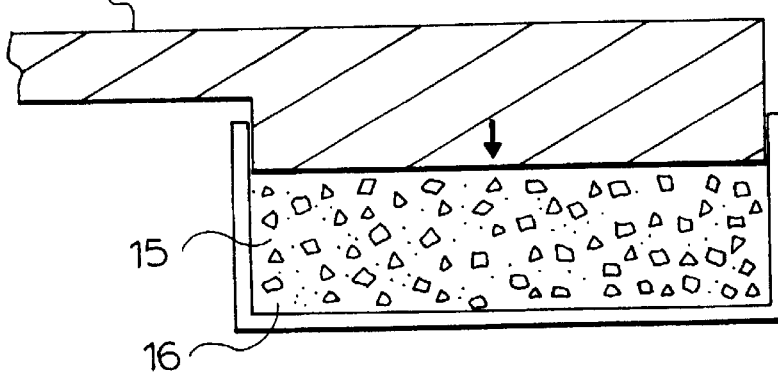
FIG. 7 is a cross sectional view showing the application of pressure to compact the material laid into the mold cavity and ensure the encapsulation of the waste or filler particles.
Figure 8:
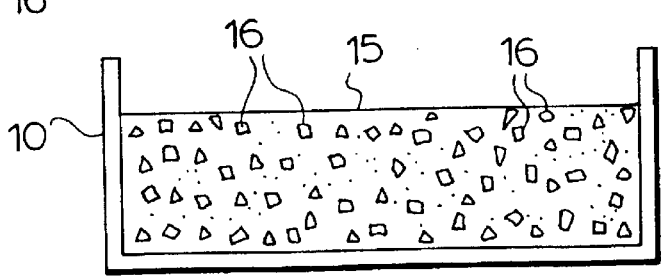
FIG. 8 is a view similar to FIG. 7 showing the substructure material after it has been compacted.

FIG. 7 shows the platen 17 brought down to apply pressure to the molten charge 12 to compact it into a dense mass as illustrated in FIG. 8.

The subjection of the charge 12 to the compacting pressure in the compression molding step, as explained, produces a strong dense structural component or substructure of encapsulated particulate material held together in a high strength bonding and having the desired predetermined shape.

The selection of the particulate material 16 and the ratio of the thermoplastic material will depend upon the end use of the door 50. Where the door will be exposed to substantial temperature changes, the particulate waste or filler material preferably comprises, at least in part. a fibrous material such as saw dust, or cloth, or paper particles. The thermoplastic material 15 preferably comprises recycled PVC or polyethylene and the ratio by weight would preferably be of the order of about to 30% to 60% particulate material with the balance being the thermoplastic binder material or principally thermoplastic binder together with some additional particulate material such as fly ash or kiln dust added to impart hardness and strength.

It will be appreciated that because that frame or substructure in the example of the steel door involves particulate material encapsulated and bound together into a compact mass, it not only affords the ability to use waste particles that would otherwise pose a disposal problem but to use them very advantageously and safely to control or define the physical properties of the substructure. At the same time, since the function of the thermoplastic binder is to encapsulate and bind together the particulate material, recycled thermoplastics can also be used advantageously rather than be discarded as scrap so that the entire substructure can be totally of recycled or waste materials so that it can be produced at a very low cost.

From an environmental point of view, it will be appreciated that it is not necessary to cut down trees to obtain access to wood fibers which may take the form of sawdust or ground up splintered wood or other wood wastage which can serve as the particulate material. In addition, it will be appreciated that the basic shape of the product into which the composite component or substructure is to be incorporated is or can be determined by the shape of the composite component or substructure which can be molded into such shape without having to be fabricated. On the other hand, the molded composite product or substructure can be readily cut, drilled, and machined ready for assembly or attachment of the materials to be supported thereby by conventional fasteners or industrial glues. It will also be understood that the molded composite component or substructure can be clad or sheatheed with a cover layer eg. of rubber or latex by dipping or other like processes or, if its surface is prepared, it can be painted, stained or have patterns applied thereto.

With the particulate material compressively encapsulated and strongly bonded together by the thermoplastic material during the compression molding, as explained, a very wide range of waste or filler particulate materials can be advantageously employed. Recycled or reground thermoplastic materials whose melting point is above the thermoplastic material which is heated to the molten state in the molding process to constitute the binder can serve as a useful solid or filler particulate material. Also useful are reground or recycled thermosetting plastics particles. In the fibrous group of useful particulates, ground up scrap wood along with saw dust, ground cloth, paper give expansion control and for hardness short fine glass fibers are useful. Typical other waste particulate materials which give structural strength include fly ash, kiln dust, ground peanut shells, ground rice husks and corn husks.

Without intending to limit the invention, other useful particulate materials include sand, concrete particles, metal particles, and rubber particles.

It will be understood also that combinations of these various particulate materials can be used to select the requisite physical properties of the structural component or substructure according to the nature and use of the composite end product for which the substructure forms the base.

As mentioned, examples of recycled plastics which may be used as the thermoplastic binder include reground low, medium and high density polyethylene, polypropylene, polyethylene terephthalate (PET), nylon, ABS and PVC.

FIG. 9 again illustrates the use of a component substructure 18 prepared as discussed above in the form of a rectangular frame for forming a composite product comprising an insulated panel 19. In this case, the substructure frame 18 is inserted between a pair of cover plates or cladding 20 which are screwed, nailed or otherwise secured to the frame 18 and the interior filled with a foamed insulation 21 as in the case of the steel door 50. The cover plates 20 may be of suitable material which would include steel, aluminum or plastic sheeting.

While conveniently the substructure 18 is a complete frame, it will be appreciated that the substructure may be made up of individual parts such as the half frame sections 22 shown in FIG. 10.

Again the choice of the particulate material will depend upon the end use of the panel and also on the properties of the material forming the cover plates or cladding 20 with the fibrous particles being useful for expansion control and such particulates as fly ash being useful for hardness.

Figure 12:
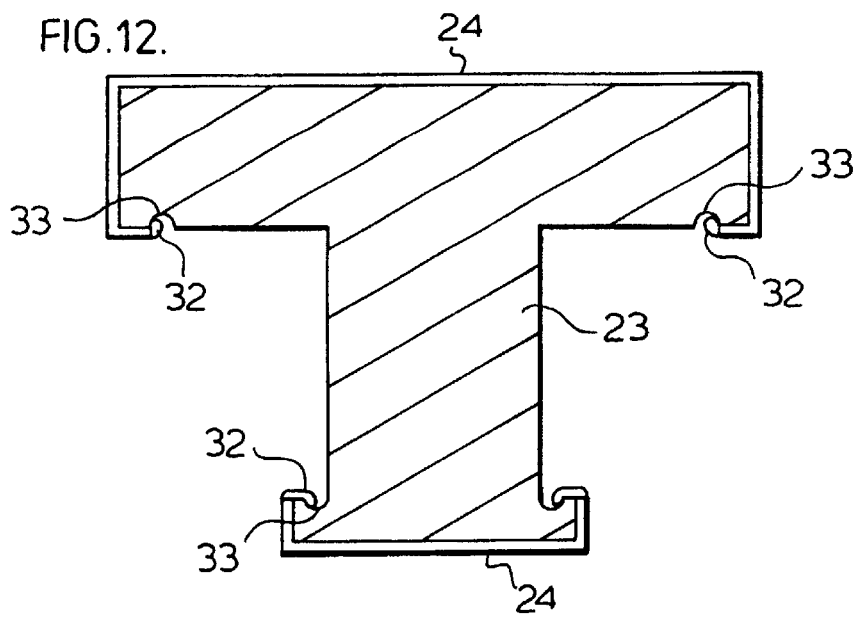
FIG. 12 is a cross sectional view of a typical window profile comprising a compression molded substructure in which exposed surfaces are covered with attached sheathing.

FIG. 12 illustrates a composite component or substructure 23 produced as discussed above which has been compression molded into the shape of a window frame profile with exposed surfaces having cladding 24 of plastic or metal secured thereto.

Figure 13:
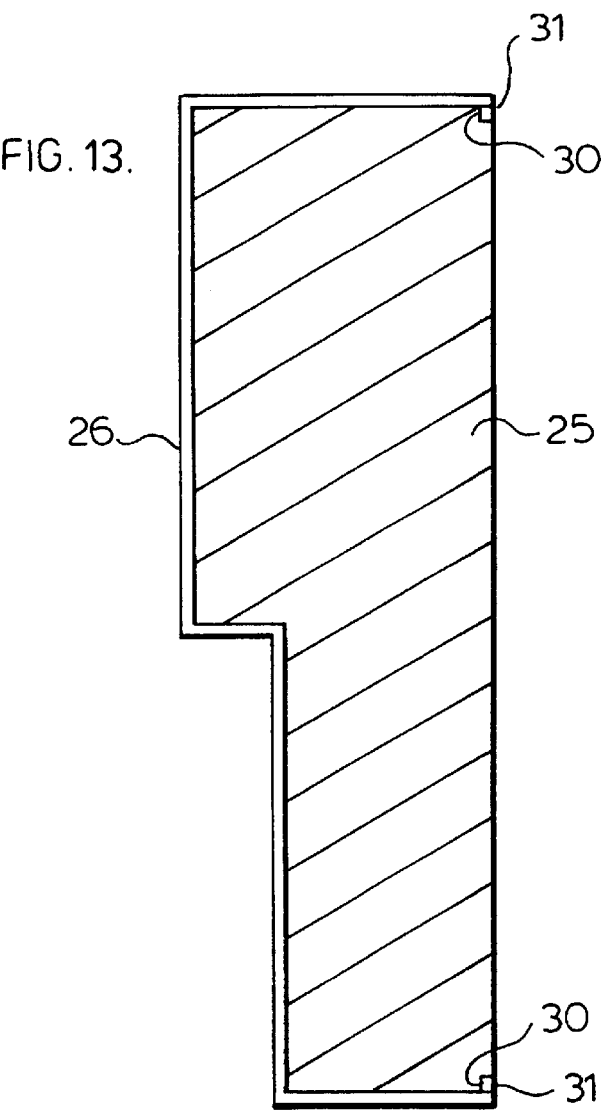
FIG. 13 is a view similar to FIG. 12 but showing a typical door frame profile.

In FIG. 13, the compression molded composite component or substructure 25 is in the form of a door frame profile having cladding 26 in the form of plastic or metal secured to exposed surfaces thereof.

The selection of the particulate material of the substructures 23 and 25 in the form of the window and door frame profiles respectively is selected for their end use application. Where they are to be used in locations experiencing wide temperature changes, the particulate material preferably includes a significant proportion of fibrous particles up to the order of 30% of 40% by weight of the substructure.

While completely fabricated composite products such as the door 50 or the panel 19 can have the composite substructure or frame molded as a complete unit frequently the composite compression molding of the invention may simply be a component for assembly with other similar compression molded components. For instance, where frames such as the door and window frames of FIGS. 13 and 12 respectively are being incorporated into the construction of a house or other building, adjustments are likely to be required. An example is the length of the door side frames or jambs indicated at 27 in FIG. 14 may have to be adjusted. Therefore these frame members are delivered to the job in lengths substantially longer than the height of the door frame so that they can be cut to the appropriate length on site.

Figure 14:
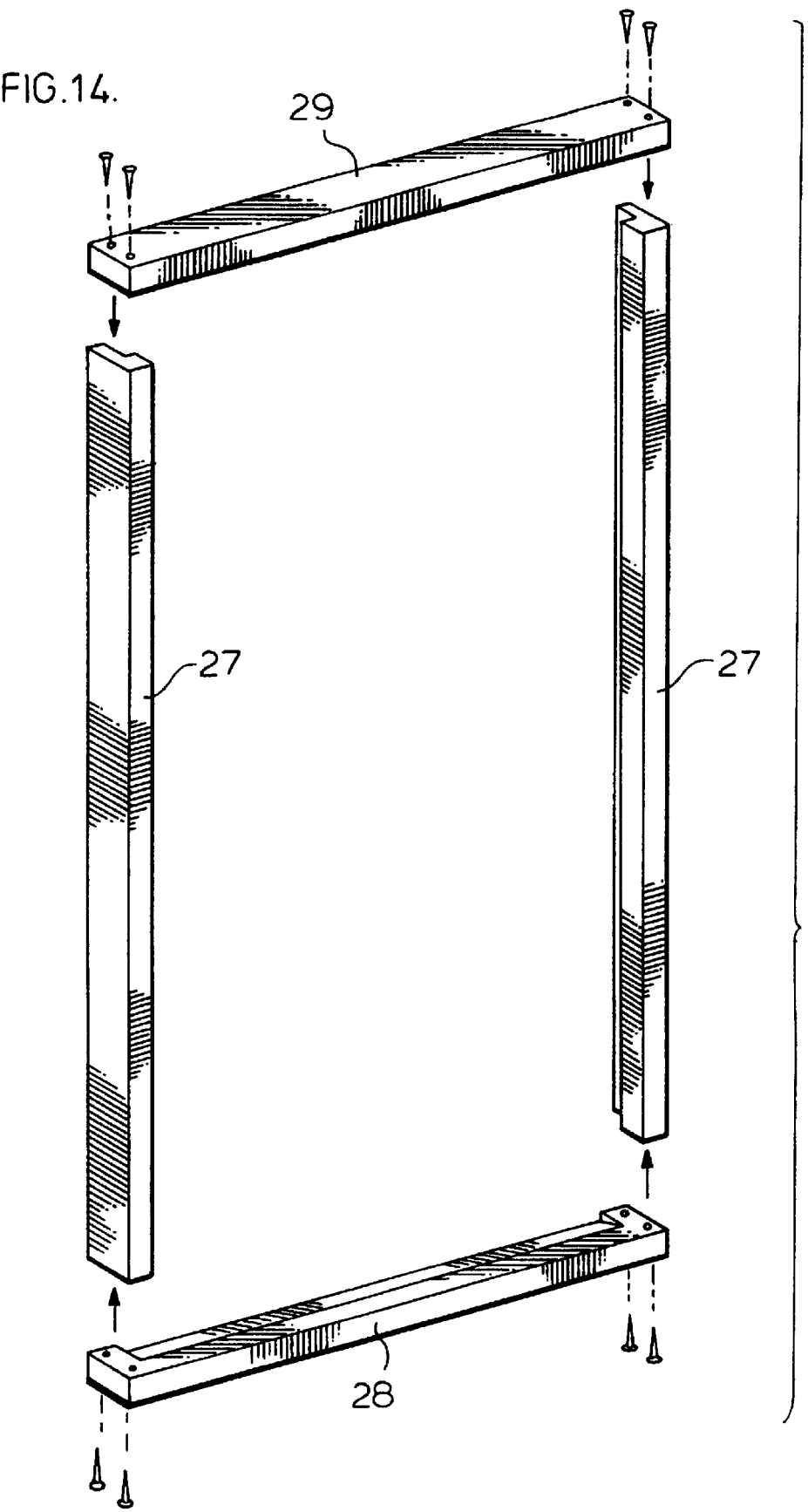
FIG. 14 is a perspective view illustrating the assembly of a composite door frame in which the components have been prepared in accordance with the invention.

FIG. 14 illustrates the fabrication of the door frame in which the side frames or jambs 27 are secured to a sill frame 28 and a header frame 29. All of these frames comprise compression molded composite components of particulate material encapsulated and bound together by a thermoplastic binder as discussed above. Suitable cladding covering exposed surfaces of the door frame can be secured to the substructure through the use of screws, nails or other fasteners. Additionally or alternatively, the cladding may be secured by providing grooves 30 in the substructure such as illustrated in FIG. 13 and the cladding can be provided with inturned fingers 31 as illustrated in FIG. 13 to engage in the grooves 30. Alternatively the exposed surfaces of the frames may be appropriately treated and painted or have a film laminated thereto.

Similarly, with respect to the window profile substructure 23, the cladding 24 can have inturned fingers 32 engaging in grooves 33 formed in the substructure 23 as illustrated in FIG. 12.

Another area where wood is widely used as a substructure is in the construction of truck door panels where the use of a substructure of composite particulate material according to the present invention provides an important saving in wood while, at the same time, providing enhanced physical properties to the doors eliminating warping, rotting, delaminating, and rendering the doors impervious to water and insect attack.

Figure 15:
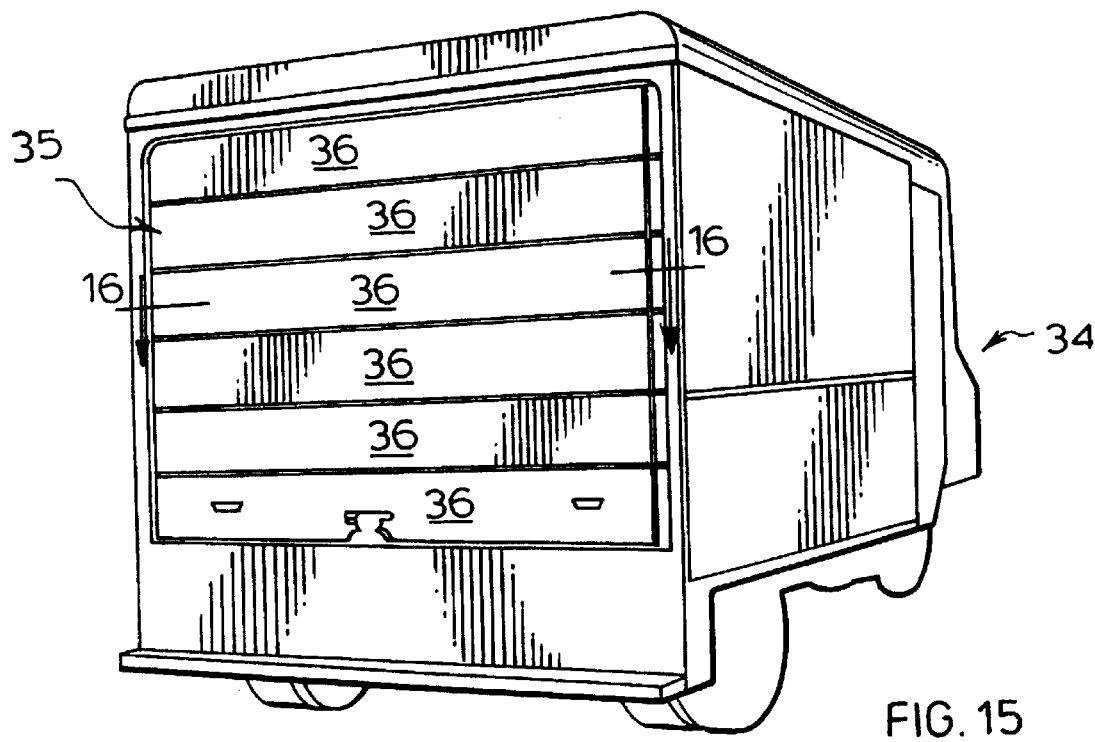
FIG. 15 is a perspective view of a truck illustrating a folding rear door made up of a series of panels which can be hinged together in any desired manner (the hinges not being shown).

FIG. 15 diagrammatically illustrates a truck 34 having a folding rear door generally designated at 35 made up of a series of horizontal door panels 36 pivotally connected together by suitable hinging (not shown).

Figure 16:
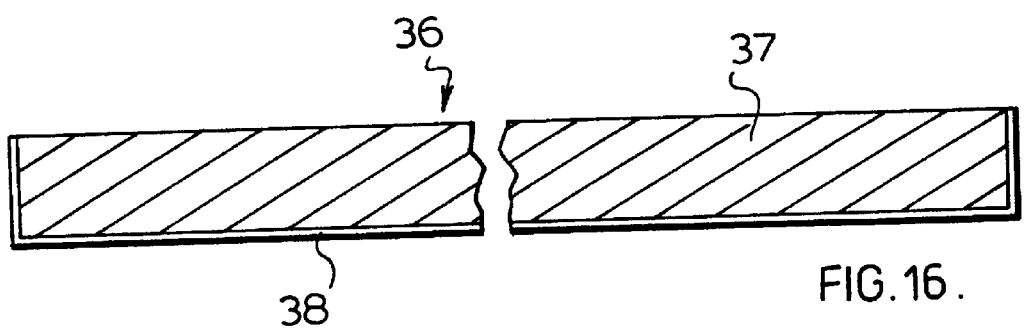
FIG. 16 is a sectional view on the line 16—16 of FIG. 15 showing the compression molded substructure to which a cover or sheathing has been attached covering the outer and edge surfaces of the substructure.

In accordance with the present invention, these door panels 36 employ a composite substructure 37 shown in FIG. 16 comprising the thermoplastically encapsulated and bound particulate material defining the panel shape. A cladding 38 secured to the substructure 37 covering the exposed rear face of the door panel. Again, the particulate material and the quantity thereof will be selected to meet the desired physical properties for the door panel 36. By the use of the recycled or waste particulate material, not only can a significant cost reduction be made from present door panels of the type illustrated by the door panel 36, but such panels utilizing the substructure of the present invention will be substantially superior to those presently in use.

Figure 17:
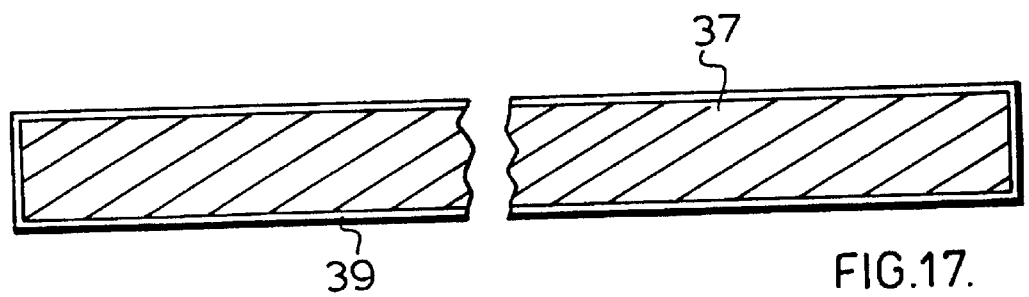
FIG. 17 is a view similar to FIG. 16 but showing the substructure entirely sheathed.

While FIG. 16 illustrates the substructure 37 has been clad on the outside and edges, the entire substructure 36 can be completely clad by the cladding 39 illustrated in FIG. 17.

Figure 18:
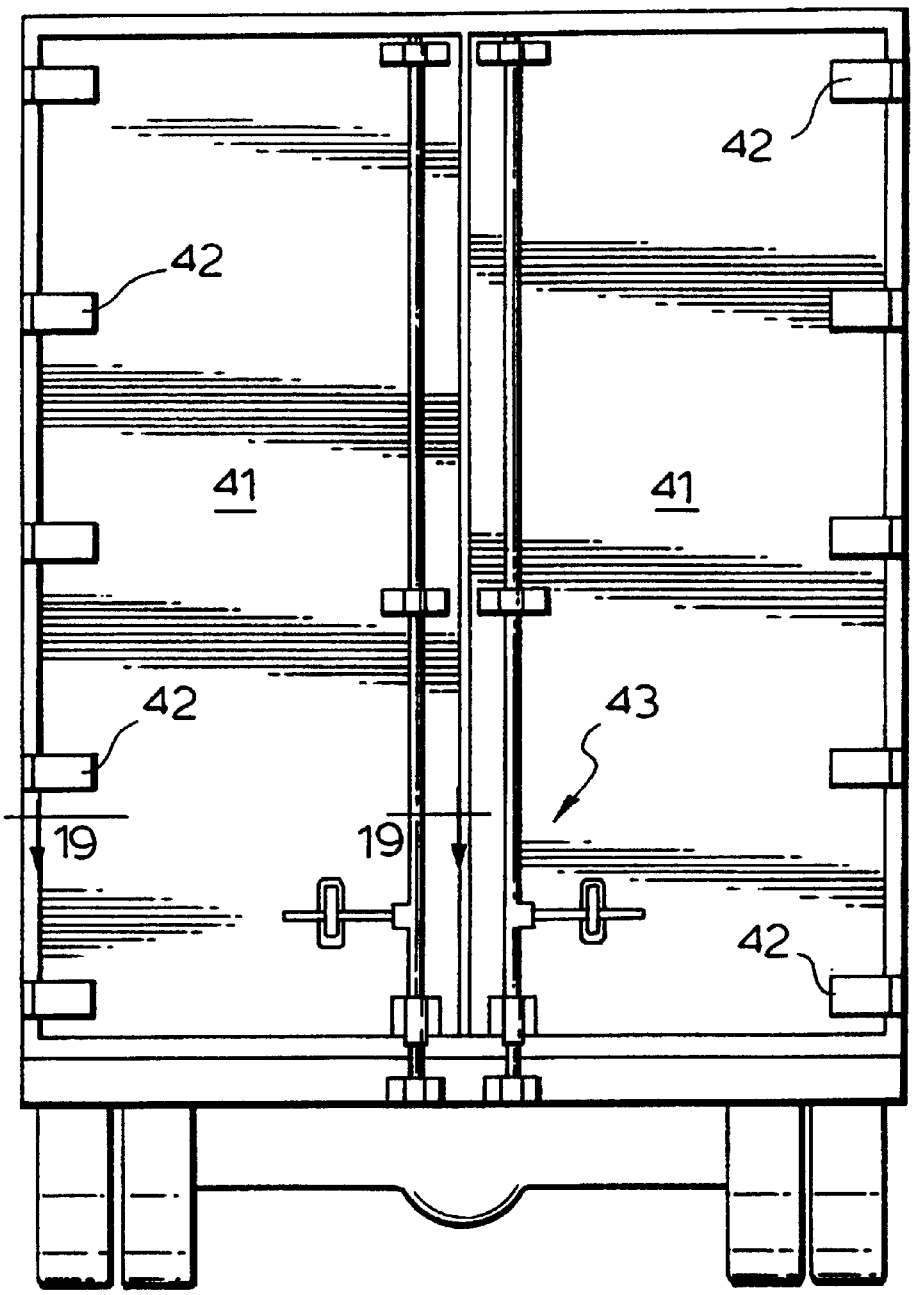
FIG. 18 is a rear end view of a truck of the type using a pair of vertically hinged swing doors.

FIG. 18 illustrates another door arrangement widely used on the rear of trucks such as the truck generally designated at 40. In this case, the door arrangement comprises a pair of door panels 41 secured by hinges 42 at their outer edges and arranged to swing together to meet in the center where they can be secured by a suitable lock arrangement generally designated at 43. At present these panels 41 comprise large plywood panels which may be covered as desired. If the plywood panels should chip or splinter, as is frequently the case, they become waste products adding to the enormous amount of wood that is involved in their production. Moreover, again, such door panels are exposed to all types of weather and are subject to deterioration.

Figure 19:
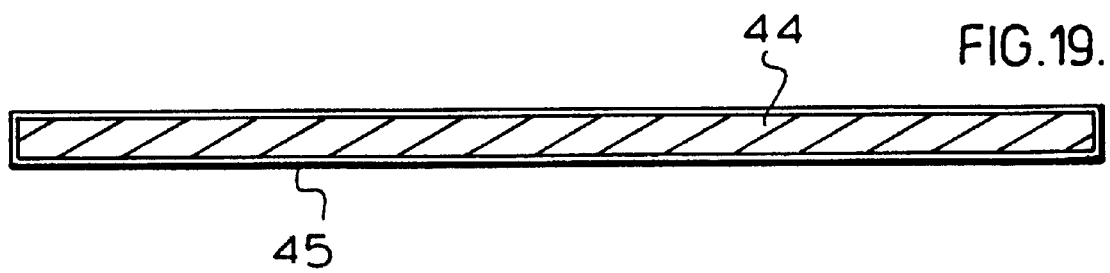
FIG. 19 is a cross sectional view on the line 19—19 of FIG. 18 showing the composite structure of the door panel in accordance with the invention with the door panel in this example being fully clad or sheathed.

By the use of the present invention, such door panels can be provided at a tremendous saving in costs while eliminating the cutting down of many trees and at the same time improving the environment by utilizing waste or recycled materials. Thus, as illustrated in FIG. 19, each of the panels 41 is formed of a substructure 44 of particulate material encapsulated and bound together by a thermoplastic binder provided with a cladding 45 secured thereto.

The cladding 45 may be plastic or metal such as thin aluminum or steel sheeting and, if desired, can be used to cover only the outside faces of the door panels 41.

It will be understood that only a limited number of examples of products using the compression molded composite material of the present invention have been illustrated and that the compression molded products, components or substructures of the invention can be advantageously employed in the manufacture of a vast number of different products. It is intended that all such products fall within the scope of the appended claims.

The embodiments of the invention in which an exclusive property or privilege is claimed are defined as follows:

1. A process for producing a composite product having a predetermined shape, said process being characterized by subjecting a mixture of particles of thermoplastic material and particles of waste or filler material to a mixing operation of such high intensity so as to raise the temperature of the particles of thermoplastic material and particles of waste or filler through particle collision until the particles of thermoplastic material reach a molten state causing the molten plastic to coat and bond with the hot particles of waste or filler material to form a hot mass of particles of waste or filler material which are both coated with and bound together by said thermoplastic material and then with the thermoplastic material in the molten state, compressing the hot mass to force the thermoplastic material into any interstices and irregularities of the particles of waste or filler material while forming the hot mass to a desired product shape to produce, upon cooling thereof, a compacted composite product in which the particles of waste or filler material are encapsulated by the thermoplastic material.

2. A process as claimed in claim 1 characterized in that said particles of thermoplastic material used for mixing with said waste or filler particles are particles of recycled thermoplastic material.

3. A process as claimed in claim 2 characterized in that said waste or filler particles comprise particles of recycled material.

4. A process as claimed in claims 1, 2 or 3 characterized in that said particles of thermoplastic material used for mixing with said waste or filler particles comprise at least about 10% by weight of said particles.

5. A process as claimed in claims 1, 2 or 3 characterized in that said particles of thermoplastic material used for mixing with said waste or filler particles comprise about 30% to 70% by weight of said particles.

6. A process as claimed in claims 1, 2 or 3 characterized in that said particles of thermoplastic material used for mixing with said waste or filler particles comprise about 40 to 60% by weight of said particles.

7. A process as claimed in claims 1, 2 or 3 characterized in that said particles of thermoplastic material comprise one or more of reground low, medium or high density polyethylene, polypropylene, polyethylene terephthalate, nylon, ABS, and PVC.

8. A process as claimed in claims 1, 2 or 3 characterized in that said waste or filler particles comprise one or more of sawdust, ground wood pieces, ground cloth, paper, glass, fly ash, kiln dust, ground shells or husks, rubber particles, metal particles, sand, concrete and ground thermosetting plastic material.

9. A process as claimed claim 2 characterized in that said particles of recycled thermoplastic material have a softening temperature of about 160 to 170° C. and become molten at a temperature of about 200 to 230° C.

10. A process as claimed in claim 9 characterized in that said waste or filler material includes particles of thermoplastic material having a melting point above about 230° C.

* * * * *